July 16, 1946.   B. D. LOUGHLIN ET AL   2,404,238
POSITION-INDICATING SYSTEM
Filed Sept. 20, 1943
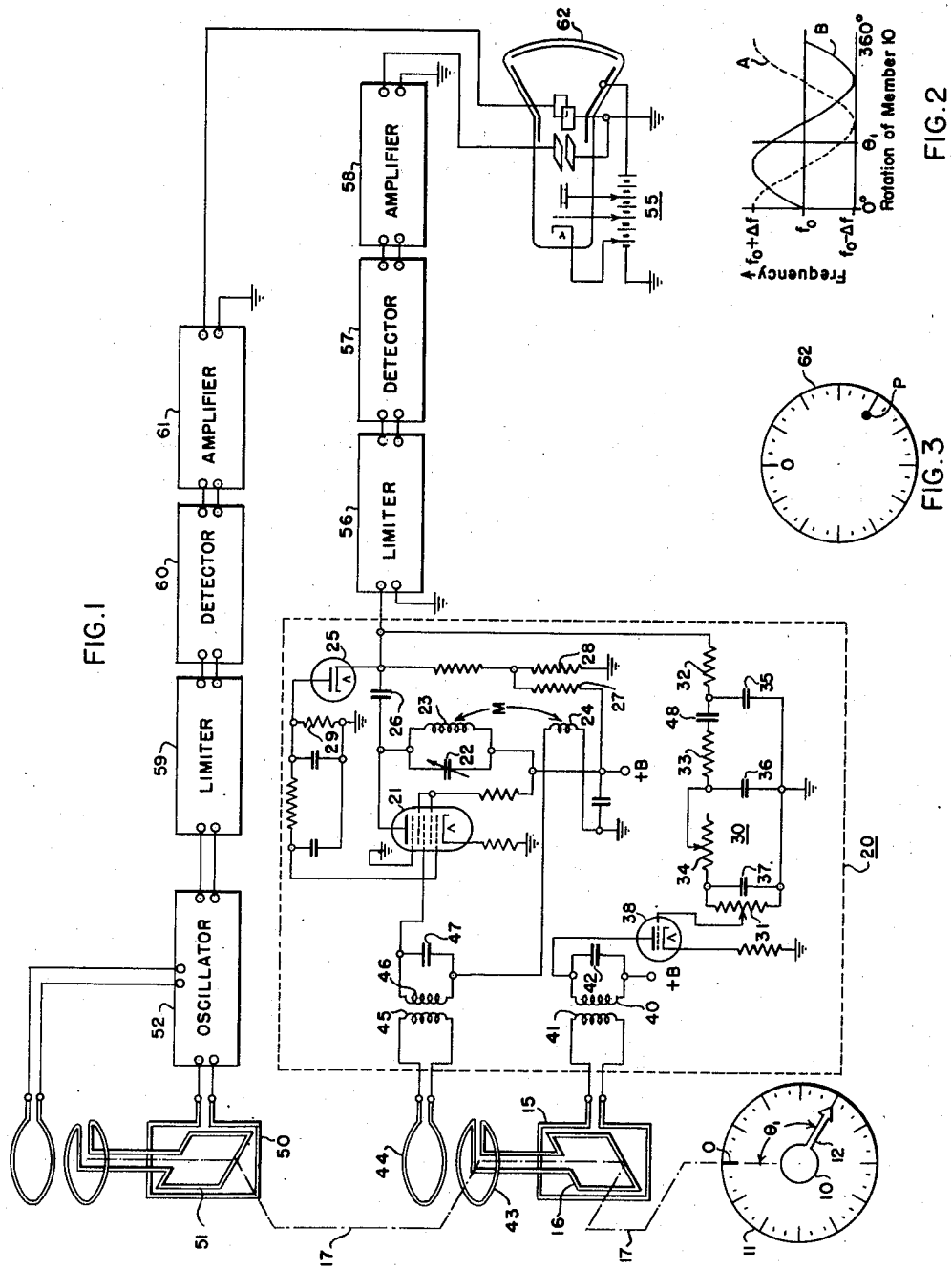
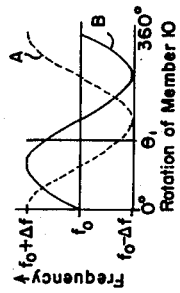
INVENTOR
BERNARD D. LOUGHLIN
JAMES F. CRAIB
BY
ATTORNEY Patented July 16, 1946

2,404,238

UNITED STATES PATENT OFFICE 2,404,238

POSITION-INDICATING SYSTEM

Bernard D. Loughlin, Bayside, and James F. Craib, Little Neck, N. Y., assignors, by mesne assignments, to Hazeltine Research, Inc., Chicago, Ill., a corporation of Illinois Application September 20, 1943, Serial No. 503,072

11 Claims. (Cl. 177—351)

This invention relates in general to a system for indicating the relative position of two relatively movable members. While the invention is subject to a wide range of applications, it is especially suited for indicating the relative position of two relatively rotatable members and will be described in that connection.

Many prior art arrangements have been proposed for indicating by electrical means the relative position of two relatively rotatable members. Some of these prior art arrangements have comprised a device having a rotor and stator, one or both of which comprise a single-phase winding or crossed windings, at a transmitting station where the relatively rotatable members are located, as well as a similar device at a receiving station where the relative position of the movable members is to be indicated. In arrangements of the type under consideration, the signals transmitted to the receiving station generally comprise two carrier waves of the same frequency but modulated differently in the coupling system provided at the transmitting station in accordance with the relative movement of the movable members. However, it may be very undesirable to use apparatus of the general type under consideration at the receiving station. For example, it may be desirable to provide at the receiver a cathode-ray tube indicator which is substantially free of inertia effects.

Another type of indicating system which has been proposed effectively comprises an alternator for generating a polyphase output at the transmitting station together with a suitable motion-reproducing device, such as a cathode-ray tube, at the receiving station. In such a system voltages are supplied to the receiving station which can be used directly to deflect the cathode-ray beam of the indicator tube. However, in such a system the response is dependent upon the speed of rotation of the alternator at the transmitting station, a feature which in some cases is very undesirable.

It is an object of the invention, therefore, to provide an improved system for indicating the relative position of two relatively movable members which avoids one or more of the disadvantages of prior art arrangements mentioned above.

It is another object of this invention to provide an improved system for indicating the relative position of two relatively movable members in which the apparatus employed at the transmitting station has a high degree of stability.

In accordance with the invention, a system for indicating the relative position of two relatively movable members comprises an impedance-coupling means having relatively movable primary and secondary elements effective to vary the degree and the sense of the electrical coupling therebetween in accordance with variations in the relative position of such elements. The system also comprises means for mechanically coupling the primary element to one of the aforementioned members, means for mechanically coupling the secondary element to the other of the aforementioned members, and means effective in the absence of the impedance-coupling means for generating oscillations of a given frequency much greater than the effective maximum frequency of motion between the two aforementioned members. Additionally, the system includes means for varying the frequency of the generated oscillations in either direction from the aforesaid given frequency in accordance with the electrical coupling between the elements of the impedance-coupling means and means for utilizing the generated oscillations to produce an indication of the relative position of the two members.

For a better understanding of the present invention, together with other and further objects thereof, reference is had to the following description taken in connection with the accompanying drawing, and its scope will be pointed out in the appended claims.

In the drawing, Fig. 1 comprises a schematic representation of a system in accordance with the invention for indicating the relative position of two relatively movable members; Fig. 2 is a graph utilized in explaining the operation of the invention; and Fig. 3 represents a position indication of the type which may be obtained in the system of Fig. 1.

Referring now more particularly to Fig. 1, the invention is there represented in a system for indicating the relative position of two relatively rotatable members. These members are shown as a rotatable handwheel 10 and a stationary dial plate 11, which may, for example, comprise a portion of a control arrangement (not shown). A pointer 12, secured to the shaft of handwheel 10 for rotation therewith, and suitable graduations or scale divisions on the dial plate 11 provide a local indication of the condition of the control arrangement. The indicating system of the present invention, presently to be described, effectively monitors members 10, 11 for the purpose of producing a similar indication at a point which may be remote thereto.

The indicating system comprises an impedance-coupling means having relatively movable primary and secondary elements the relative position of which determines the electrical coupling therebetween. This means is provided by an inductive-coupling device having relatively rotatable primary and secondary elements 15 and 16, respectively. The secondary element 16 rotates within the primary element 15 so that their relative position determines the sense and magnitude of the electrical coupling therebetween. As illustrated, primary element 15 is stationary and thus is effectively mechanically coupled to stationary dial plate 11. However, secondary element 16 is mechanically coupled to handwheel 10 for rotation therewith by a means, such as a shaft indicated by broken line 17, and, preferably, this coupling is such that the secondary element rotates synchronously with handwheel 10.

The position-indicating system also includes means effective in the absence of the inductive-coupling device 15, 16 for generating oscillations of a frequency $f_0$ which is much greater than the effective maximum frequency of motion between members 10, 11. Such generating means comprises a generator or oscillator 20 of conventional design and construction. As illustrated, the oscillator includes a vacuum tube 21 and a frequency-determining circuit included in the anode-cathode circuit thereof, the frequency-determining circuit being comprised of a parallel combination of a condenser 22 and an inductor 23. Either element 22 or 23, or both, may be adjustable to establish the operating frequency of the oscillator at a desired predetermined value within its operating-frequency range, condenser 22 being shown adjustable for this purpose. An in-phase feed-back voltage for sustaining oscillations is supplied from the output to the input circuit of the oscillator by way of an inductor 24, coupled to inductor 23 through mutual inductance M.

Frequency stability of the described oscillator is obtained through the use of an automatic amplitude control arrangement which will be described in more detail hereinafter and which, per se, maintains the amplitude of the generated oscillations substantially constant. This arrangement, which also may be of conventional design, includes an automatic volume control or A. V. C. rectifier 25 coupled between the output circuit of the oscillator and a control electrode thereof. The rectifier is caused to have an amplitude-delay action by a delay bias applied to the cathode thereof from a bleeder network including resistors 27 and 28 and the source of space current +B of the oscillator. The A. V. C. voltage developed across a resistor 29 in the load circuit of rectifier 25 is applied to a control electrode of tube 21 through a conventional resistance-capacitance filter.

The position-indicating system further includes means for varying the frequency of the generated oscillations in accordance with the electrical coupling between the elements of impedance-coupling means 15, 16. To this end, an arrangement is provided for applying the generated oscillations to primary element 15 of the described inductive-coupling device, thereby to induce in secondary element 16 thereof oscillations having an amplitude modulated in accordance with the relative position of members 10, 11. This arrangement comprises a coupling condenser 26, a network 30, a repeater 38, and a transformer 40, 41 connected in cascade, in the recited order, between the output circuit of tube 21 and primary element 15. Series resistors 32, 33 and 34 and shunt condensers 35, 36 and 37 of network 30 provide a phase-shifting network in the coupling circuit for a purpose described more fully hereinafter. Resistor 34 is a voltage divider for adjusting the phase shift obtained in the described network, while condenser 48 is a direct current blocking condenser. The input circuit of repeater 38 is coupled to network 30 through a second voltage divider 31 for limiting, or controlling, the amplitude of the oscillations applied to primary element 15. The primary winding 40 of transformer 40, 41 is included in the output circuit of repeater 38 and is tuned by a condenser 42 so that the current through winding 40 has a substantially quadrature-phase relation with reference to the voltage applied to the input circuit of the repeater.

The oscillations induced in secondary element 16, by virtue of the application of oscillations to element 15, are applied to generator 20 with such phase as to vary the frequency of the generated oscillations in accordance with the relative position of members 10, 11. For this purpose, secondary element 16 is coupled to the input circuit of vacuum tube 21 through inductively-coupled loops 43 and 44 and a transformer 45, 46, secondary winding 46 thereof being tuned by a condenser 47. Loop 43 is rotated with element 16, as indicated by broken line 17, while loop 44 is stationary.

It will be apparent from the immediately preceding paragraphs that a second voltage feed-back path is provided for oscillator 20, this path including inductive-coupling device 15, 16. Preferably, the components of this feed-back path are designed and arranged as indicated so that the voltage applied therethrough to the input circuit of tube 21 has a substantial quadrature-phase component with reference to the in-phase voltage fed back to the input circuit of tube 21 by inductor 24. The amplitude and polarity of this quadrature-phase component vary in accordance with the relative position of elements 15, 16 and, thus, also in accordance with the relative position of members 10 and 11.

A second impedance-coupling means, having substantially the same construction as that aforedescribed, is included in the system under consideration to provide a synchronous indication of the relative motion of members 10, 11. This additional impedance-coupling means has a stationary primary element 50 and a secondary element 51 also mechanically coupled, as indicated by broken line 17, with handwheel 10 for rotation therewith. An oscillator 52, which may be generally similar to oscillator 20, is coupled with the second impedance-coupling means in a manner described in connection with the coupling between elements 15, 16 and 20.

Further, the position-indicating system includes means for utilizing the generated oscillations to produce an indication of the relative position of members 10, 11. This means consists of an indicator 55, preferably comprising a conventional cathode-ray tube which may be remotely located from the aforedescribed apparatus. The oscillations from oscillator 20 are utilized in a vertical deflection channel to derive voltages for deflecting the cathode-ray beam of tube 55 in a vertical direction. This channel is provided by an amplitude limiter 56, a frequency-modulation detector 57, and a deflection amplifier 58 connected in cascade and coupled to the output circuit of oscillator 20. Voltages for deflecting the cathode-ray beam in a horizontal direction are derived from the oscillations of oscillator 52 in a horizontal deflection channel comprising an amplitude limiter 59, a frequency-modulation detector 60, and a deflection amplifier 61 connected in cascade to the output circuit of oscillator 52. Scale divisions corresponding to the graduations of dial plate 11 are provided on screen 62 of the tube to aid in obtaining position indications as indicated in Fig. 3.

Before considering the operation of the described system, it is desirable to refer to the adjustments required to obtain optimum operation. In particular, it is preferred to adjust the system to have the operating characteristics represented by the curves of Fig. 2. In this figure, curves A and B represent the frequency variations of oscillators 20 and 52, respectively, in response to the rotation of handwheel 10, assuming the oscillators to have the same mean operating frequency $f_0$. It will be evident that the frequencies of the generated oscillations are varied in accordance with a sine function of the rotation of handwheel 10 between the limiting values of $f_0 \pm \Delta f$. The maximum frequency variation $\Delta f$ is determined by the maximum amplitude of the induced oscillations supplied from secondary elements 16 and 51, respectively, to oscillators 20 and 52. Voltage divider 31 is adjusted to limit this maximum frequency variation to a desired predetermined value. Additionally, voltage divider 34 of network 30 is suitably adjusted to cause the frequency variations of the generated oscillations to be symmetrical about the mean frequency $f_0$. In other words, network 30 is adjusted to compensate undesirable phase shifts which may be introduced in the quadrature-phase feed-back circuit including repeater 38. For example, the phase-shift frequency characteristic of the circuit including impedance-coupling means 15, 16 will generally be found to be nonuniform over the operating frequency range of the associated oscillator and, consequently, this circuit tends undesirably to shift the phase of the oscillations induced in secondary element 16. Thus, for optimum operation, the compensation afforded by network 30 is required. While mention has been made only of the adjustments to oscillator 20, it will be understood that like adjustments are to be effected in oscillator 52.

It will be further apparent from the curves of Fig. 2 that, for optimum operation, the modulation of oscillator 20 has a phase displacement of 90 degrees with reference to the modulation of oscillator 52. To achieve this result, primary elements 15 and 50 are arranged in the same or in parallel planes, while secondary elements 16 and 51 are arranged in mutually perpendicular planes. Additionally, it is preferred so to orient element 51 with reference to handwheel 10 that there is substantially zero electrical coupling between elements 50 and 51 when pointer 12 is in registration with the zero calibration mark of dial 11. The impedance-coupling means may be arranged in this manner by adjustably connecting elements 16 and 51 with mechanical coupling means 17 in a conventional manner. With the impedance-coupling means adjusted as described, the scale associated with the screen of tube 55 may be properly oriented with reference to pointer 12. Specifically, the zero calibration mark of the scale is to be positioned at the top of the screen, as illustrated in Fig. 3.

In considering the operation of the position-indicating system, it will be assumed that the system has been adjusted in the aforementioned manner. For the assumed condition, it will be apparent that the instantaneous relative position of members 10, 11 determines the instantaneous relative position of and the electrical coupling between the primary and secondary elements of each impedance-coupling means. This electrical coupling, in turn, determines the magnitude and polarity of the quadrature-phase feed-back voltage applied to each oscillator and, in a manner similar to the operation of the well-known reactance tube, determines the instantaneous operating frequencies of oscillators 20 and 52. The generated oscillations are utilized in the horizontal and vertical deflection channels of tube 55 to derive, in a conventional manner, horizontal and vertical deflection voltages for the cathode-ray beam thereof, which voltages have a magnitude and polarity determined by the frequency of the translated oscillations. These voltages deflect the beam to a position with reference to the scale divisions on the screen of tube 55 which corresponds to the position of pointer 12 with reference to the scale divisions on dial plate 11.

The operation of the system may be more fully understood by considering the indication produced on the screen of tube 55 for a specific position of pointer 12. For example, assume the pointer to be in the position shown in Fig. 1, where it is displaced from a reference or zero position by an angle $\theta_1$. The frequencies of the oscillations generated by units 20 and 52, for this condition, are indicated by the intersections of the ordinate line $\theta_1$ in Fig. 2 with curves A and B, respectively. A positive unidirectional potential is developed in the horizontal deflection channel and a negative unidirectional potential is developed in the vertical deflection channel in response to such generated oscillations. These voltages deflect the cathode-ray beam of tube 55 to produce an indication on the screen thereof which represents the assumed position of pointer 12. Such indication is shown at P in Fig. 3.

If desired, a control arrangement may be provided for energizing the cathode-ray beam of tube 55 only when a position indication is to be obtained. Such an arrangement avoids damage to the screen caused by focusing the beam thereof on a given spot for a sustained period.

It will be apparent that if handwheel 10 is continuously rotated at a constant speed, the detector means in the horizontal and vertical deflection channels derive pulsating potentials having a sinusoidal wave form and a 90-degree phase displacement. As is well known, such deflection voltages will cause the beam of tube 55 to trace a circular path in synchronism with the rotation of member 10. If the cathode-ray tube has a long persistent screen, a circular pattern will be produced thereon indicating the path of movement of member 10. Where a specific indication of position is required in an arrangement including a continuously rotating member, it is necessary to key the operation of the indicating device at intervals which are long with reference to the persistence of the screen. This may be accomplished, for example, by modulating the intensity of the cathode-ray beam of tube 55 at intervals corresponding to predetermined positions of the rotating member.

Several factors contribute to cause the described position-indicating system to have a high degree of stability. First, the automatic amplitude control arrangement of the oscillation generators maintains the amplitude of the generated oscillations constant. For this reason, the inphase feed-back component is maintained at a constant magnitude. Additionally, each oscillation generator has its mean operating frequency $f_0$ for two positions of the inductive-coupling device associated therewith, such positions having a spacing of 180 rotational degrees and corresponding to the positions of the primary and secondary elements of the particular inductive-coupling device when there is substantially zero electrical coupling therebetween.

While the invention has been described in connection with two relatively rotatable members 10 and 11, it will be understood that the system is equally applicable for producing an indication of the relative position of two members having some other mode of movement. For the preferred embodiment, it is only necessary mechanically to couple the primary or secondary element of each impedance-coupling means with one of the movable members so that the selected element rotates in response to the relative movement of the movable members. For example, where the movable members have a relatively linear path of motion, a rack and pinion arrangement may be utilized for controlling the primary or secondary elements of the impedance-coupling means to produce a position indication.

In many applications, such as that represented in the drawing, it will be preferred to rotate one element of each impedance-coupling means in synchronism with the movement of the movable members. However, there are instances where it is desired to rotate the selected element at a frequency corresponding to some harmonic of the frequency of motion of the movable members. An example of such application of the invention may be found in copending application Serial No. 503,069, filed concurrently herewith in the name of Bernard D. Loughlin.

The term "effective maximum frequency of motion" as used in the foregoing description and in the appended claims is intended to describe a repeating movement or a single movement. In the latter case, this term may be defined as the reciprocal of the time required for such motion.

While oscillation generators 20 and 52 in the preferred embodiment of the invention have the same mean operating frequency, it will be understood that this is not a necessary condition. If desired, the oscillators may have widely separated operating frequencies. Furthermore, it will be apparent that while the circuit arrangement illustrated for these generators is particularly adapted for operation in the audio-frequency range, other arrangements may be utilized, such as those designed for operation in high-frequency ranges.

Several distinct advantages inherent in the position-indicating system of this invention will be immediately apparent. It will be seen, for example, that the system is capable of producing at a remote point an indication of the relative position of members 10 and 11 for the condition when those members have a continuously changing relative position and for static conditions, that is, for conditions when members 10 and 11 have a fixed relative position. In producing position indications for such static conditions, frequency modulation as utilized in the described system is especially desirable since a frequency reference may be readily obtained at the remote point through suitable frequency-selective circuits, these circuits for the illustrated embodiment comprising the discriminator arrangements of detectors 57 and 60. Furthermore, by adjusting oscillators 20 and 52 to have sufficiently different operating frequencies, the generated oscillations may be translated to remote indicator 55 and its associated elements 56–61, inclusive, by means of a single signal-translating channel which, per se, may be incapable of transmitting direct current signals, such as a standard audio-frequency telephone line.

While the connections from oscillators 20 and 52 to the indicating device 55 and its associated elements have been represented schematically, it will be understood that transmission between these units may be over a direct line or through a radio-frequency link circuit.

While there has been described what is at present considered to be the preferred embodiment of this invention, it will be obvious to those skilled in the art that various changes and modifications may be made therein without departing from the invention, and it is, therefore, aimed in the appended claims to cover all such changes and modifications as fall within the true spirit and scope of the invention.

What is claimed is:

1. A system for indicating the relative position of two relatively movable members comprising, an impedance-coupling means having relatively movable primary and secondary elements effective to vary the degree and the sense of the electrical coupling therebetween in accordance with variations in the relative position of said elements, means for mechanically coupling said primary element to one of said members, means for mechanically coupling said secondary element to the other of said members, means effective in the absence of said impedance-coupling means for generating oscillations of a given frequency much greater than the effective maximum frequency of motion between said two members, means for varying the frequency of said generated oscillations in either direction from said given frequency in accordance with the electrical coupling between the elements of said impedance-coupling means, and means for utilizing said generated oscillations to produce an indication of the relative position of said two members.

2. A system for indicating the relative position of two relatively movable members comprising, an impedance-coupling means having relatively movable primary and secondary elements effective to vary the degree and the sense of the electrical coupling therebetween in accordance with variations in the relative position of said elements, means for mechanically coupling said primary element to one of said members, means for mechanically coupling said secondary element to the other of said members, means effective in the absence of said impedance-coupling means for generating oscillations of a given frequency much greater than the effective maximum frequency of motion between said two members, means for applying said generated oscillations to said primary element, whereby there are induced in said secondary element oscillations having an amplitude modulated in accordance with the relative position of said two members, means for applying said induced oscillations to said generating means with such phase as to vary the frequency of said generated oscillations in either direction from said given frequency in accordance with said relative position, and means for utilizing said generated oscillations to produce an indication of the relative position of said two members.

3. A system for indicating the relative position of two relatively movable members comprising, an impedance-coupling means having relatively movable primary and secondary elements effective to vary the degree and the sense of the electrical coupling therebetween in accordance with variations in the relative position of said elements, means for mechanically coupling said primary element to one of said members, means for mechanically coupling said secondary element to the other of said members, means effective in the absence of said impedance-coupling means for generating oscillations of a given frequency much greater than the effective maximum frequency of motion between said two members, means for applying said generated oscillations to said primary element, whereby there are induced in said secondary element oscillations having an amplitude modulated in accordance with the relative position of said two members, means for applying said induced oscillations to said generating means in substantially phase-quadrature relation with reference to said generated oscillations thereby to vary the frequency of said generated oscillations in either direction from said given frequency in accordance with said relative position, and means for utilizing said generated oscillations to produce an indication of the relative position of said two members.

4. A system for indicating the relative position of two relatively movable members comprising, an inductive-coupling means having relatively movable primary and secondary elements effective to vary the degree and the sense of the electrical coupling therebetween in accordance with variations in the relative position of said elements, means for mechanically coupling said primary element to one of said members, means for mechanically coupling said secondary element to the other of said members, means effective in the absence of said inductive-coupling means for generating oscillations of a given frequency much greater than the effective maximum frequency of motion between said two members, means for varying the frequency of said generated oscillations in either direction from said given frequency in accordance with the electrical coupling between the elements of said inductive-coupling means, and means for utilizing said generated oscillations to produce an indication of the relative position of said two members.

5. A system for indicating the relative position of two relatively movable members comprising, an impedance-coupling means having relatively movable primary and secondary elements effective to vary the degree and the sense of the electrical coupling therebetween in accordance with variations in the relative position of said elements, means for mechanically coupling said primary element to one of said members, means for mechanically coupling said secondary element to the other of said members, means effective in the absence of said impedance-coupling means for generating oscillations of a given frequency much greater than the effective maximum frequency of motion between said two members, means for varying the frequency of said generated oscillations in either direction from said given frequency in accordance with the electrical coupling between the elements of said impedance-coupling means, means for adjusting the maximum frequency variation of said generated oscillations, and means for utilizing said generated oscillations to produce an indication of the relative position of said two members.

6. A system for indicating the relative position of two relatively movable members comprising, an impedance-coupling means having relatively movable primary and secondary elements effective to vary the degree and the sense of the electrical coupling therebetween in accordance with variations in the relative position of said elements, means for mechanically coupling said primary element to one of said members, means for mechanically coupling said secondary element to the other of said members, means effective in the absence of said impedance-coupling means for generating oscillations of a given frequency much greater than the effective maximum frequency of motion between said two members, means for applying said generated oscillations to said primary element, whereby there are induced in said secondary element oscillations having an amplitude modulated in accordance with the relative position of said two members, means for applying said induced oscillations to said generating means with such phase as to vary the frequency of said generated oscillations in either direction from said given frequency in accordance with said relative position, means for limiting the amplitude of said oscillations applied to said primary element to adjust the maximum frequency variation of said generated oscillations, and means for utilizing said generated oscillations to produce an indication of the relative position of said two members.

7. A system for indicating the relative position of two relatively movable members comprising, an impedance-coupling means having relatively rotatable primary and secondary elements effective to vary the degree and the sense of the electrical coupling therebetween in accordance with variations in the relative position of said elements, means for mechanically coupling one of said elements to one of said members, means for so mechanically coupling the other of said elements to the other of said members that said other element rotates in synchronism with the relative movement of said two members, means effective in the absence of said impedance-coupling means for generating oscillations of a given frequency much greater than the effective maximum frequency of motion between said two members, means for varying the frequency of said generated oscillations in either direction from said given frequency in accordance with the electrical coupling between the elements of said impedance-coupling means, and means for utilizing said generated oscillations to produce an indication of the relative position of said two members.

8. A system for indicating the relative position of two relatively movable members comprising, an impedance-coupling means having relatively rotatable primary and secondary elements effective to vary the degree and the sense of the electrical coupling therebetween in accordance with variations in the relative position of said elements, means for mechanically coupling one of said elements to one of said members, means for so mechanically coupling the other of said elements to the other of said members that said other element rotates in response to relative movement of said two members, means effective in the absence of said impedance-coupling means for generating oscillations of a given frequency much greater than the effective maximum frequency of motion between said two members, circuit means for applying said generated oscillations to said primary element whereby there are induced in said secondary element oscillations having an amplitude modulated in accordance with the relative position of said two members, circuit means for applying said induced oscillations to said generating means with such phase as to vary the frequency of said generated oscillations in either direction from said given frequency in accordance with said relative position, said impedance-coupling means and said circuit means having a phase-shift frequency characteristic tending undesirably to shift the phase of said induced oscillations, means for compensating at least in part said phase-shift frequency characteristic to cause the frequency variations of said generated oscillations to be substantially symmetrical with reference to said given frequency, and means for utilizing said generated oscillations to produce an indication of the relative position of said two members.

9. A system for indicating the relative position of two relatively movable members comprising, an impedance-coupling means having relatively rotatable primary and secondary elements effective to vary the degree and the sense of the electrical coupling therebetween in accordance with variations in the relative position of said elements, means for mechanically coupling one of said elements to one of said members, means for so mechanically coupling the other of said elements to the other of said members that said other element rotates in response to relative movement of said two members, means effective in the absence of said impedance-coupling means for generating oscillations of a given frequency much greater than the effective maximum frequency of motion between said two members, circuit means for applying said generated oscillations to said primary element whereby there are induced in said secondary element oscillations having an amplitude modulated in accordance with the relative position of said two members, circuit means for applying said induced oscillations to said generating means with such phase as to vary the frequency of said generated oscillations in either direction from said given frequency in accordance with said relative position, said impedance-coupling means and said circuit means having a phase-shift frequency characteristic tending undesirably to shift the phase of said induced oscillations, a phase-shifting network included in said means for applying oscillations to said primary element for compensating at least in part said phase-shift frequency characteristic to cause the frequency variations of said generated oscillations to be substantially symmetrical with reference to said given frequency, and means for utilizing said generated oscillations to produce an indication of the relative position of said two members.

10. A system for indicating the relative position of two relatively rotatable members comprising, an impedance-coupling means having relatively movable primary and secondary elements effective to vary the degree and the sense of the electrical coupling therebetween in accordance with variations in the relative position of said elements, means for mechanically coupling said primary element to one of said members, means for mechanically coupling said secondary element to the other of said members, means effective in the absence of said impedance-coupling means for generating oscillations of a given frequency much greater than the effective maximum frequency of motion between said two members, means for varying the frequency of said generated oscillations in either direction from said given frequency in accordance with the electrical coupling between the elements of said impedance-coupling means, detecting means coupled to said generating means for deriving from said generated oscillations a pulsating potential having an amplitude modulated in accordance with the relative position of said two members, and means for utilizing said pulsating potential to produce an indication of the relative position of said two members.

11. A system for indicating the relative position of two relatively rotatable members comprising, an impedance-coupling means having relatively movable primary and secondary elements effective to vary the degree and the sense of the electrical coupling therebetween in accordance with variations in the relative position of said elements, means for mechanically coupling said primary element to one of said members, means for mechanically coupling said secondary element to the other of said members, means effective in the absence of said impedance-coupling means for generating oscillations of a given frequency much greater than the effective maximum frequency of motion between said two members, means for varying the frequency of said generated oscillations in accordance with the electrical coupling between the elements of said impedance-coupling means, detecting means coupled to said generating means for deriving from said generated oscillations a pulsating potential having an amplitude modulated in accordance with the relative position of said two members, a cathode-ray tube, means for utilizing said pulsating potential to deflect the cathode-ray beam of said tube in one direction, means for deriving a similar pulsating potential having a predetermined phase displacement with reference to said first-named unidirectional potential, and means for utilizing said last-named pulsating potential to deflect said beam in another direction normal to said one direction, thereby to produce a synchronous indication of the motion of said two members.

BERNARD D. LOUGHLIN.
JAMES F. CRAIB.